(12) United States Patent
Huang

(10) Patent No.: US 10,030,799 B2
(45) Date of Patent: Jul. 24, 2018

(54) PIPE JOINT

(71) Applicant: IFOG COMPANY LTD., Hsinchu (TW)

(72) Inventor: Ming-Ching Huang, Taichung (TW)

(73) Assignee: IFOG COMPANY LTD., Hsinchu (TW)

( * ) Notice: Subject to any disclaimer, the term of this patent is extended or adjusted under 35 U.S.C. 154(b) by 134 days.

(21) Appl. No.: 15/218,282

(22) Filed: Jul. 25, 2016

(65) Prior Publication Data

US 2017/0356580 A1 Dec. 14, 2017

(30) Foreign Application Priority Data

Jun. 8, 2016 (TW) .............................. 105208648 U

(51) Int. Cl.
*F16L 37/02* (2006.01)
*F16L 25/06* (2006.01)
*F16L 37/092* (2006.01)

(52) U.S. Cl.
CPC ............. *F16L 37/02* (2013.01); *F16L 25/065* (2013.01); *F16L 37/0925* (2013.01)

(58) Field of Classification Search
CPC ....... F16L 25/065; F16L 37/02; F16L 37/091; F16L 37/092; F16L 37/0925; F16L 37/098; F16L 37/0985
USPC ............................ 285/90, 323, 331, 308, 339
See application file for complete search history.

(56) References Cited

U.S. PATENT DOCUMENTS

| 4,657,286 A * | 4/1987 | Guest | F16L 37/0925 |
| | | | 285/323 |
| 5,165,735 A * | 11/1992 | Nardi | F16L 25/065 |
| | | | 285/90 X |
| 7,354,079 B2 * | 4/2008 | Rehder | F16L 37/091 |
| | | | 285/323 X |
| 7,380,838 B2 * | 6/2008 | Paluncic | F16L 37/0925 |
| | | | 285/323 X |
| 9,022,432 B2 * | 5/2015 | Firestine | F16L 37/092 |

FOREIGN PATENT DOCUMENTS

TW           M475540        4/2014

* cited by examiner

*Primary Examiner* — Gregory John Binda
*Assistant Examiner* — Zachary T Dragicevich
(74) *Attorney, Agent, or Firm* — Muncy, Geissler, Olds & Lowe, P.C.

(57) ABSTRACT

A pipe joint for coupling to at least one pipe is disclosed in the present invention. The pipe joint includes a main body and at least one positioning socket. The main body has a runner and at least one opening communicated with the runner. The runner has an insertion area adjacent to the opening. The positioning socket has a head, an inserting portion, a pipe channel, a radial threaded hole and a bolt. The inserting portion is inserted into the runner via the opening. The pipe channel runs through the head and the inserting portion in an axial direction of the positioning socket. The threaded hole is formed on the head and communicated with the pipe channel. The bolt is adapted to engage with the threaded hole for abutting against the outer surface of the pipe.

5 Claims, 11 Drawing Sheets

PIPE JOINT

BACKGROUND OF THE INVENTION

1. Field of the Invention

The present invention relates generally to a pipe joint of a piping system for connecting hard pipes or soft pipes.

2. Description of the Related Art

Pipe joints are commonly seen at intersections of pipes, turning points or tubing ends of piping systems. It is generally required that the pipe joints have the characteristics that can tightly fit the pipes without leakage. In addition, the pipe joints also need the ability that the pipes can be easily attached thereto or detached therefrom.

Taiwan Patent No. M475540 discloses a "push-in connector for pipes and piping systems," in which the main body thereof has slidable resilient locking rings and positioning sockets on both ends. The positioning sockets can grip with the outer surface of the pipe with its teeth formed at the distal end thereof, such that the pipe can be fixed in position.

Nevertheless, the teeth formed on the resilient arms are suitable for the soft pipes only but not hard pipes. Besides, when there is a need to separate the pipe from the connector, these two parts engage so tightly that the pipe is hard to be detached even with great effort.

SUMMARY OF THE INVENTION

It is therefore a main objective of the present invention to provide a pipe joint for pipes to be easily attached thereto or detached therefrom.

To achieve the above and other objectives of the present invention, the present invention provides a pipe joint for coupling to at least one pipe. The pipe joint includes a main body and at least one positioning socket. The main body has a runner, at least one opening communicated with the runner, and a recess formed on an outer periphery of the main body. The runner has an insertion area adjacent to the opening and an inner stopping lip adjacent to the insertion area. The insertion area includes a slide-contacting section, a tapering section and a divergent section. The tapering section is located between the slide-contacting section and the divergent section. The tapering section is more remote from the opening than the slide-contacting section. The inner stopping lip is radially extended to a center of the main body from the runner. The inner stopping lip has an annular inclined surface facing the divergent section. An accommodating zone is defined between the divergent section and the annular inclined surface. The recess is adapted for a tool to clamp. The positioning socket has a head, an inserting portion and a pipe channel. The inserting portion is inserted into the insertion area via the opening. The pipe channel runs through the head and the inserting portion in an axial direction of the positioning socket. The inserting portion has a large diameter segment, a small diameter segment, an engaging segment and a plurality of slots. The small diameter segment is located between the large diameter segment and the engaging segment. The small diameter segment is more remote from the head than the large diameter segment. An outer diameter of the small diameter segment is smaller than that of the large diameter. The outer diameter of the large diameter segment is substantially equal to an inner diameter of the slide-contacting section. The engaging segment has a plurality of teeth extending toward a center of the positioning socket. A distal end of the engaging segment is formed with an abutting surface adapted to abut against the annular inclined surface. The slots are extended from the distal end of the engaging segment toward the small diameter segment along the axial direction in a manner that the inserting portion is resilient, radially expandable and compressible.

After the inserting portion is inserted into the insertion area, the positioning socket is capable of axially slide in the main body within a sliding travel, and the engaging segment is located in the accommodating zone. The pipe channel is adapted for the pipe to insert therethrough.

When the abutting surface of the engaging segment does not abut against the annular inclined surface of the inner stopping lip, an inner diameter of the teeth as a whole is smaller than an inner diameter of the pipe channel for the teeth to grip an outer surface of the pipe.

When the positioning socket is located at a deepest position of the slide travel, the abutting surface of the engaging segment tightly abuts against the annular inclined surface so as to radially expand the inserting portion, and thus the inner diameter of the teeth as a whole is enlarged to be not smaller than that of the pipe channel.

To achieve the above and other objectives of the present invention, the present invention provides a method for coupling a pipe to the pipe joint disclosed hereinabove. The method includes the following steps:

A) preparing a clamping tool having two arms pivotable with each other, in which each arm has a pair of jaws at its distal end;
B) clamping in the recess of the pipe joint with the jaws of one of the arms;
C) abutting against the head of the positioning socket with the jaws of the other aim and pushing the positioning socket into the deepest position of the slide travel;
D) inserting the pipe into the runner via the pipe channel; and
E) releasing the clamping tool from the recess and the head.

To achieve the above and other objectives of the present invention, the present invention provides a method for detaching a pipe from the pipe joint disclosed herein above. The method includes the following steps:

A) preparing a clamping tool having two aims pivotable with each other, in which each arm has a pair of jaws at its distal end;
B) clamping in the recess of the pipe joint with the jaws of one of the aims;
C) abutting against the head of the positioning socket with the jaws of the other arm while the pipe is located in between the jaws of the other arm;
D) pushing the positioning socket with the other arm into the deepest position of the slide travel; and
E) withdrawing the pipe from the runner and the pipe channel.

The following detailed description will further explain the full scope of applications for the present invention. However, it should be understood that the detailed description and specific examples, while indicating preferred embodiments of the invention, are given by way of illustration only, since various changes and modifications within the spirit and scope of the invention will become apparent to those with the proper technical knowledge from this detailed description.

BRIEF DESCRIPTION OF THE DRAWINGS

The present invention can be understood more fully by referring to the detailed description below, as well as the accompanying drawings. However, it must be understood that both the descriptions and drawings are given by way of illustration only, and thus do not limit the present invention.

DETAILED DESCRIPTION OF THE INVENTION

Figure 1:
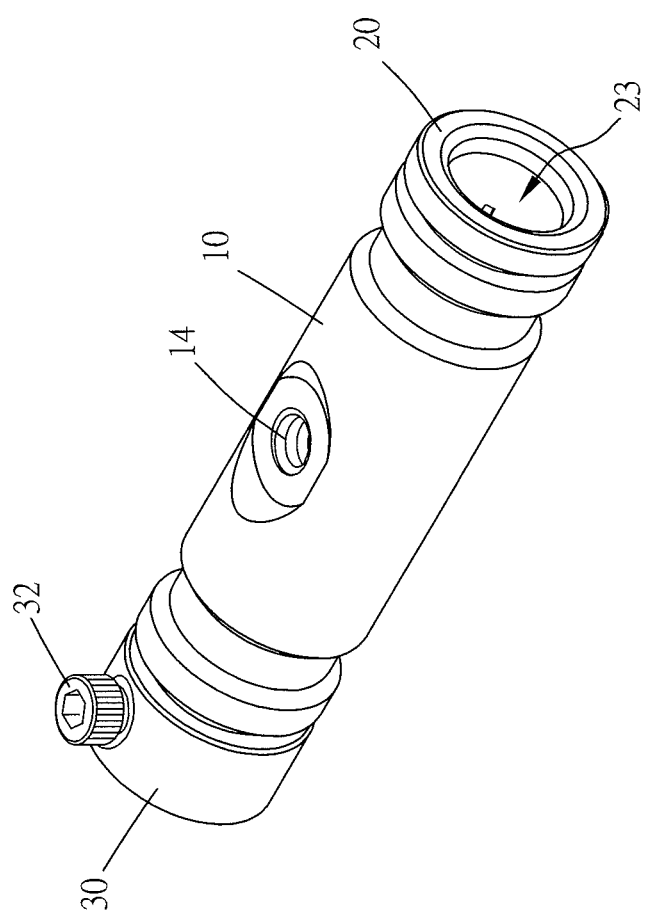
FIG. 1 is a perspective view in accordance with the first embodiment of the present invention.
Figure 2:
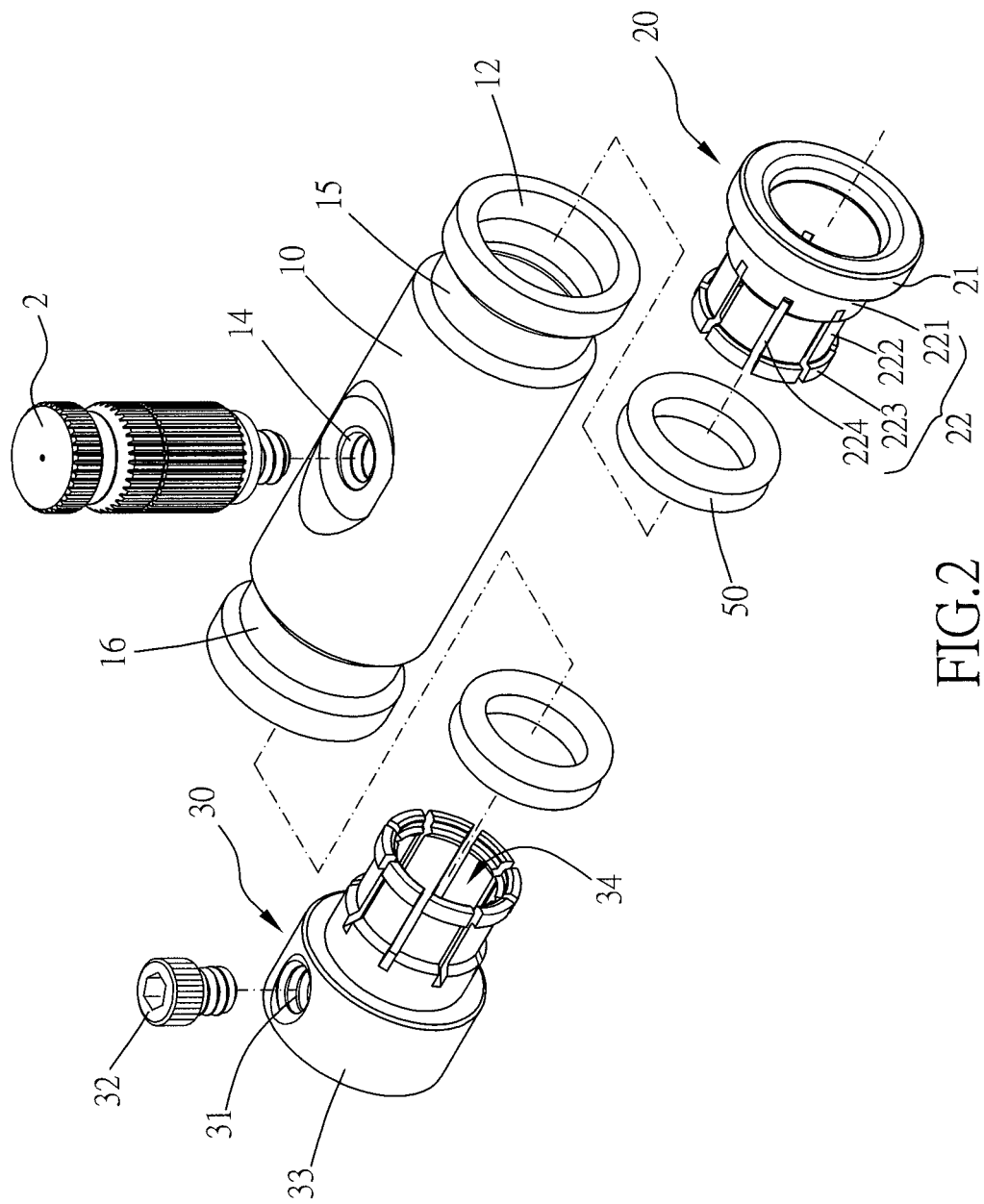
FIG. 2 is an explosive drawing in accordance with the first embodiment of the present invention, in which a nozzle is also shown on the pipe joint.
Figure 3:
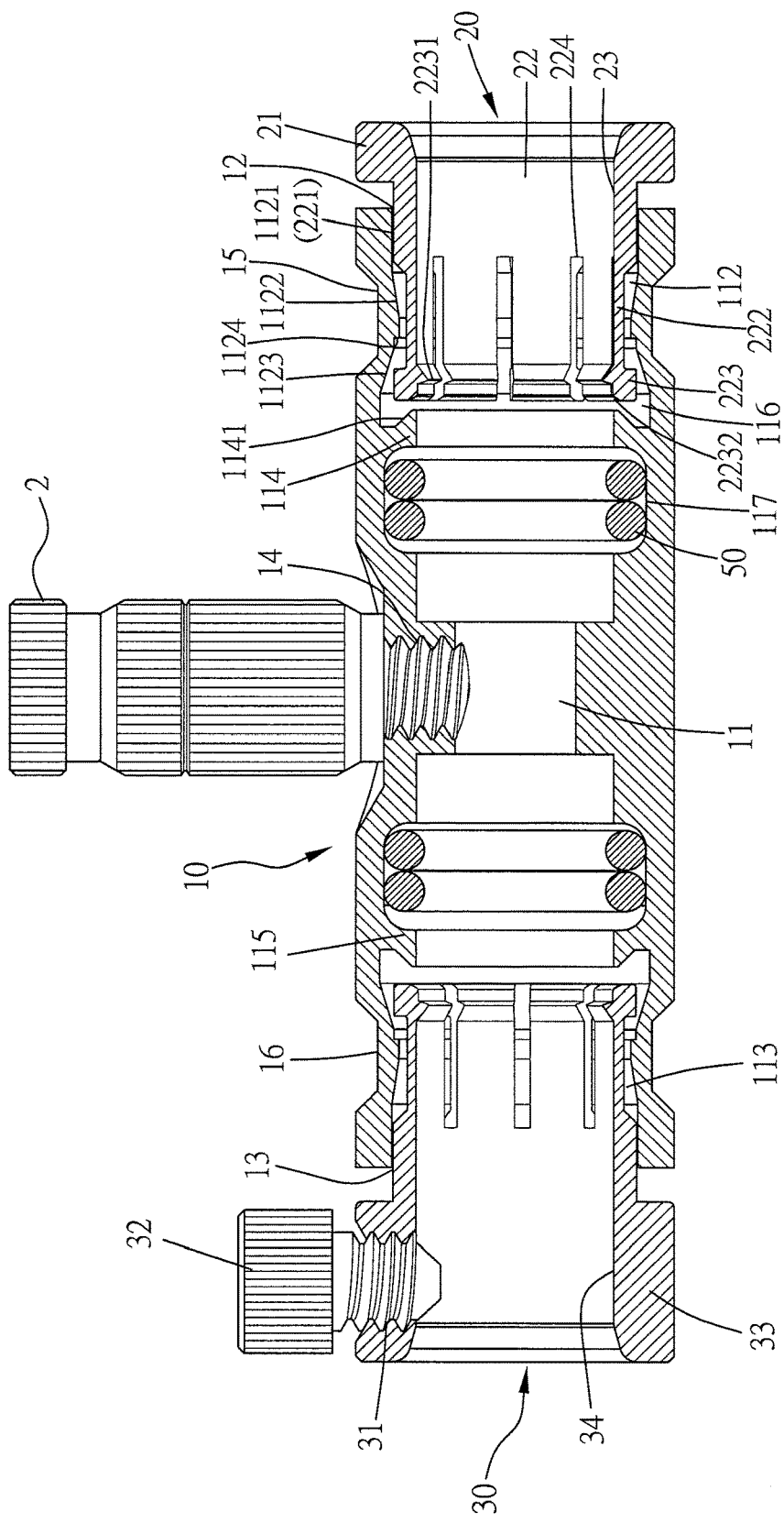
FIG. 3 is a profile in accordance with the first embodiment of the present invention, in which the nozzle is not shown in profile.

Please refer to FIGS. 1 to 3 for a pipe joint in accordance with the first embodiment of the present invention. The pipe joint includes a main body 10, a positioning socket 20 and another positioning socket 30.

The main body 10 has a runner 11, an opening 12, another opening 13, a nozzle connecting bore 14, a recess 15 and another recess 16. The openings 12, 13 are located on opposite ends of the runner 11. The nozzle connecting bore 14 is adapted for a nozzle 2 to couple therewith. The recesses 15, 16 are formed on the outer periphery of the main body 10 and are adjacent to openings 12, 13 respectively. Each recess has two side walls for a clamping tool to abut thereagainst.

The runner 11 has an insertion area 112 adjacent to the opening 12, another insertion area 113 adjacent to the opening 13, an inner stopping lip 114 adjacent to the insertion area 112 and another inner stopping lip 115 adjacent to the insertion area 113. Preferably, the insertion areas 112, 113 radially align with the recesses 15, 16 respectively.

The insertion area 112 includes a slide-contacting section 1121, a tapering section 1122, a divergent section 1123 and a stepped surface 1124. The tapering section 1122 is located between the slide-contacting section 1121 and the divergent section 1123, and the tapering section 1122 is more remote from the opening 12 than the slide-contacting section 1121. The stepped surface 1124 is located between the tapering section 1122 and the divergent section 1123, and the stepped surface 1124 is preferably vertical to the axial direction of the insertion area 112. The term "tapering" in the present disclosure means that the inner diameter gets smaller when the section gets farther away from the opening. On the contrary, the term "divergent" in the present disclosure means that the inner diameter gets larger when the section gets farther away from the opening. As such, the position, within the tapering section 1122, farthest away from the opening 112 has the smallest inner diameter among all the positions in the tapering section 1122, and the position, within the divergent section 1123, farthest away from the opening 112 has the largest inner diameter among all the positions in the divergent section 1123. In the present embodiment, the smallest inner diameter in the divergent section 1123 is substantially equal to the largest inner diameter in the tapering section 1122, and the inner diameter of the slide-contacting section 1121 is substantially equal to the largest inner diameter in the tapering section 1122.

The inner stopping lip 114 is radially extended to a center of the main body 11 from the wall of the runner 11, and the inner stopping lip 114 has an annular inclined surface 1141 facing the divergent section 1123. There is a gap between the annular inclined surface 1141 and the divergent section 1123 and thus defining an accommodating zone 116.

The insertion area 113 and the inner stopping lip 115 are substantially structurally identical to the insertion area 112 and the inner stopping lip 114, respectively. Thus their structures do not repeat here again.

The positioning socket 20 has a head 21, an inserting portion 22 and a pipe channel 23. The inserting portion 22 is inserted into the insertion area 112 of the runner 11 via the opening 12. The pipe channel 23 runs through the head 21 and the inserting portion 22 along the axial direction of the positioning socket 20. The inner diameter of the pipe channel 23 is substantially equal to the outer diameter of the pipe to be attached to the positioning socket 20.

The inserting portion 22 has a large diameter segment 221, a small diameter segment 222, an engaging segment 223 and a plurality of slots 224. The small diameter segment 222 is located between the large diameter segment 221 and the engaging segment 223, and the small diameter segment 222 is farther away from the head 21 than the large diameter segment 221. The outer diameter of the small diameter segment 222 is smaller than that of the large diameter segment 221, and the outer diameter of the large diameter segment 221 is substantially equal to the inner diameter of the slide-contacting section 1121. The engaging segment 223 has a plurality of teeth 2231 extending toward a center of the positioning socket 20. A distal end of the engaging segment 223 is formed with an abutting surface 2232 adapted to abut against the annular inclined surface 1141. In the present embodiment, the largest outer diameter of the engaging segment 223 is substantially equal to the outer diameter of the large diameter segment 221. That is to say, the large diameter segment 221 and the engaging segment 223 are bridged by the small diameter segment 222, which has the smaller outer diameter. The largest outer diameter of the engaging segment 223 is larger than the smallest inner diameter of the tapering section 1122, and the outer diameter of the small diameter segment 222 is smaller than the smallest inner diameter of the tapering section 1122. The slots 224 is extended from the distal end of the engaging segment 223 toward the small diameter segment 222 along the axial direction in a manner that the inserting portion 22 is radially resilient and is radially expandable or compressible. In the present invention, the slots 224 are further extended to the large diameter segment 221, but not limited thereto.

Subject to the radial compressibility of the inserting portion 22, the engaging segment 223 can be pressed by the tapering section 1122 and make the inserting portion 22 radially compressed inward when the inserting portion 22 is entering the insertion area 112. And thus the engaging segment 223 can pass through the tapering section 1122 and finish the insertion process. Thereafter, the inserting portion 22 rebound to its standard state, making the engaging segment 223 trapped in the accommodating zone 116. Therefore, the positioning socket 20 can only relatively slide in the main body 10 axially within a sliding travel. Under such circumstances, the large diameter segment 221 substantially slide-contacts the slide-contacting section 1121 and thus ensures the positioning socket 20 to slide smoothly. The small diameter segment 222, on the other hand, radially aligns with the tapering section 1122.

Figure 4:
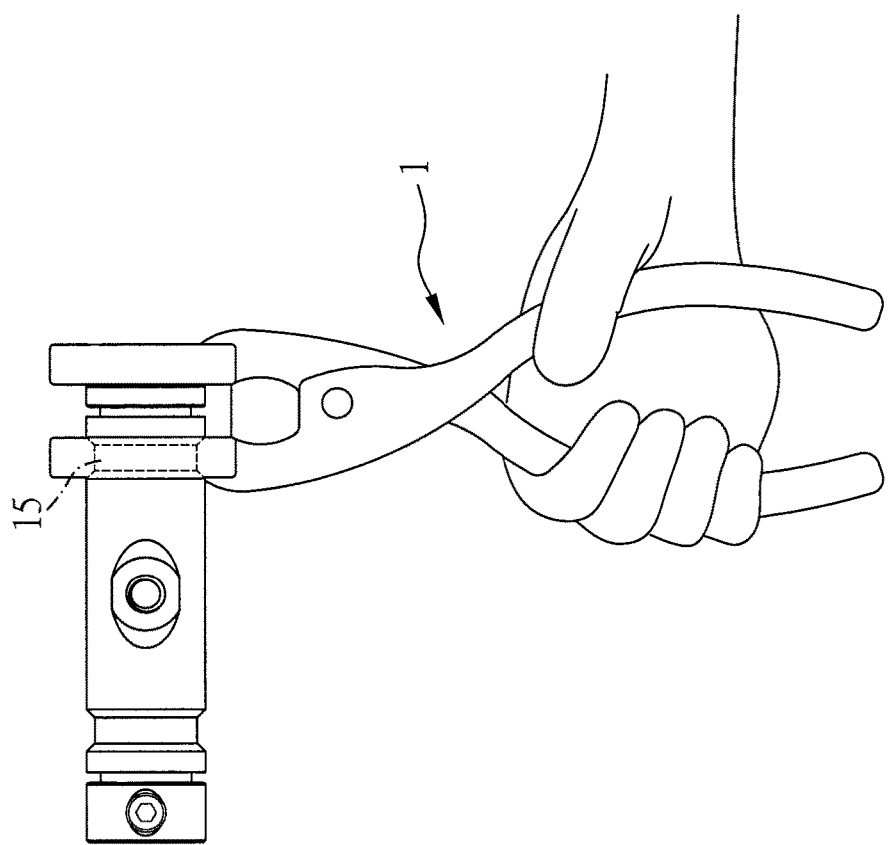
FIG. 4 is a top view in accordance with the first embodiment of the present invention, showing a user is operating the pipe joint with a clamping tool, in which the ratio of the clamping tool to the pipe joint does not reflect the real ratio.
Figure 5:
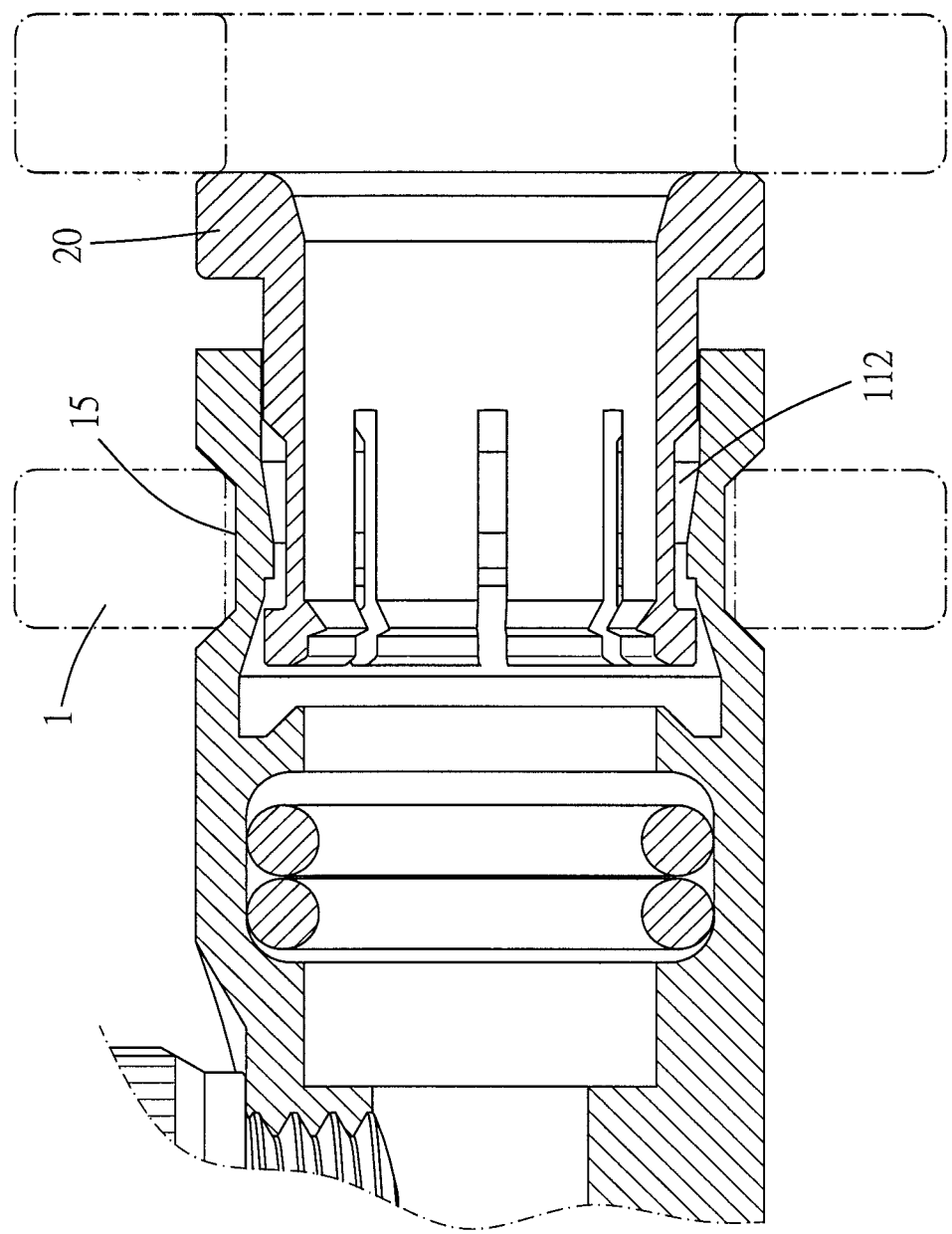
FIG. 5 is a partial profile in accordance with the first embodiment of the present invention, showing the clamping tool before pressing on the positioning socket.
Figure 6:
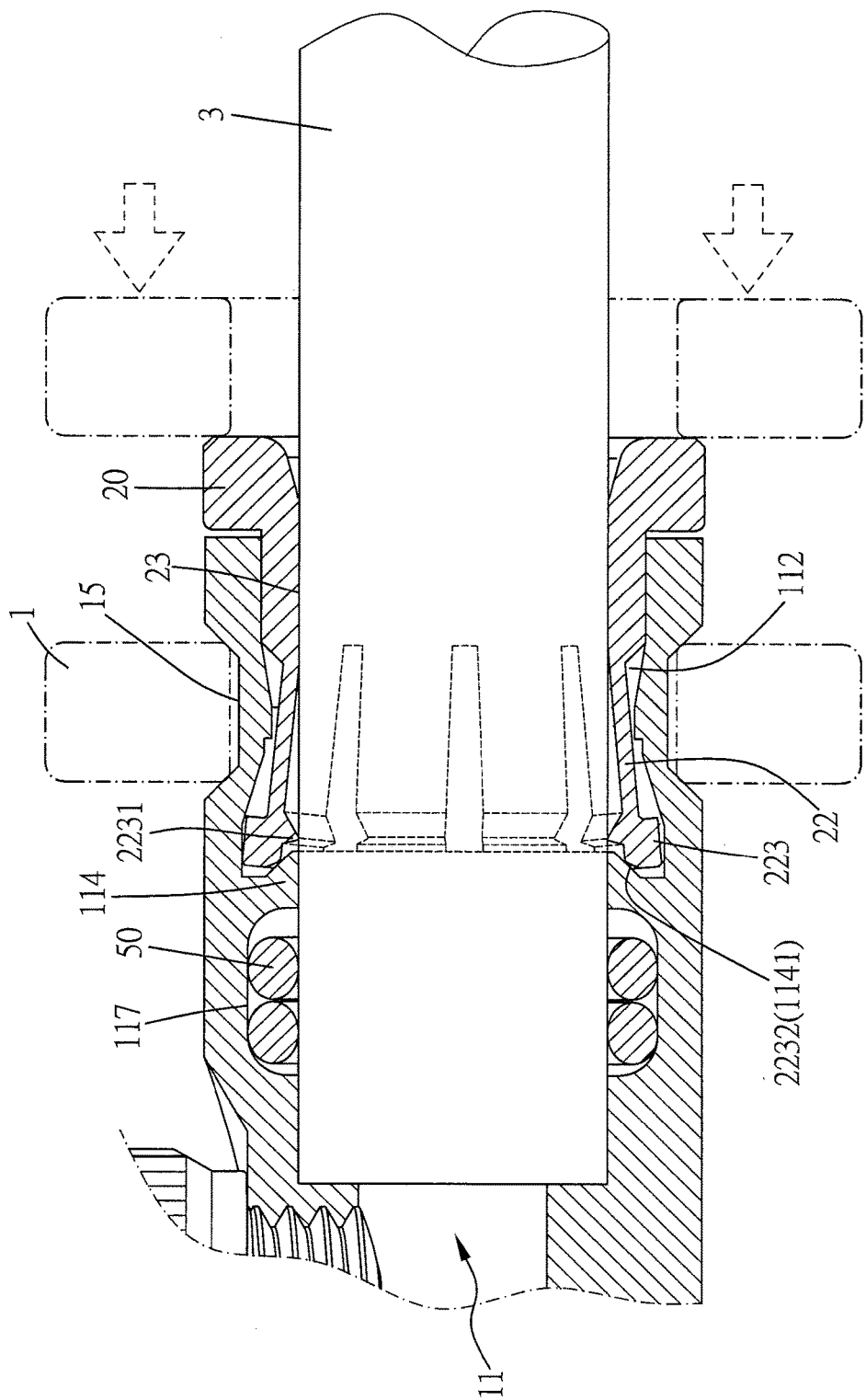
FIG. 6 is a partial profile in accordance with the first embodiment of the present invention, showing the clamping tool presses on the positioning socket.

Please refer to FIGS. 4-6. To install the pipe, one can use a customized clamping tool 1. The clamping tool 1 has two arms pivotable with each other, each arm has a pair of jaws in the shape similar to an open wrench at its distal end. One of the arms can clamp in the recess 15 with its jaws while the other arm can be used to press on the positioning socket 20 with its jaws and push the positioning socket 20 deep inside the insertion area 112 toward the deepest position of the sliding travel. Meantime, the abutting surface 2232 of the engaging segment 223 abuts against the annular inclined surface 1141 of the inner stopping lip 114 and forces the inserting portion 22 to radially expand, so as to enlarge the inner diameter of the teeth 2231 as a whole to be not smaller than the inner diameter of the pipe channel 23. As such, the pipe 3 can be easily inserted into the runner 11 via the pipe channel 23, and the pipe 3 can be protected from being scratched by the teeth 2231 during the insertion process.

To enhance the leakproof performance, the runner 11 can further have an O-ring groove 117. Thus the inner stopping lip 115 is located between the insertion area 112 and the O-ring groove 117. The pipe joint further includes two O-rings 50 received in the O-ring groove 117. Subject to the insertion process described hereinabove, the pipe 3 can be tightly fit with the O-rings 50 since the pipe 3 are protected from being scratched during the insertion. Therefore, the leakproof performance can be significantly enhanced. It is to be noted that it is not limited to install two O-rings at the O-ring groove. The number of the O-rings may vary subject to the requirements.

Figure 7:
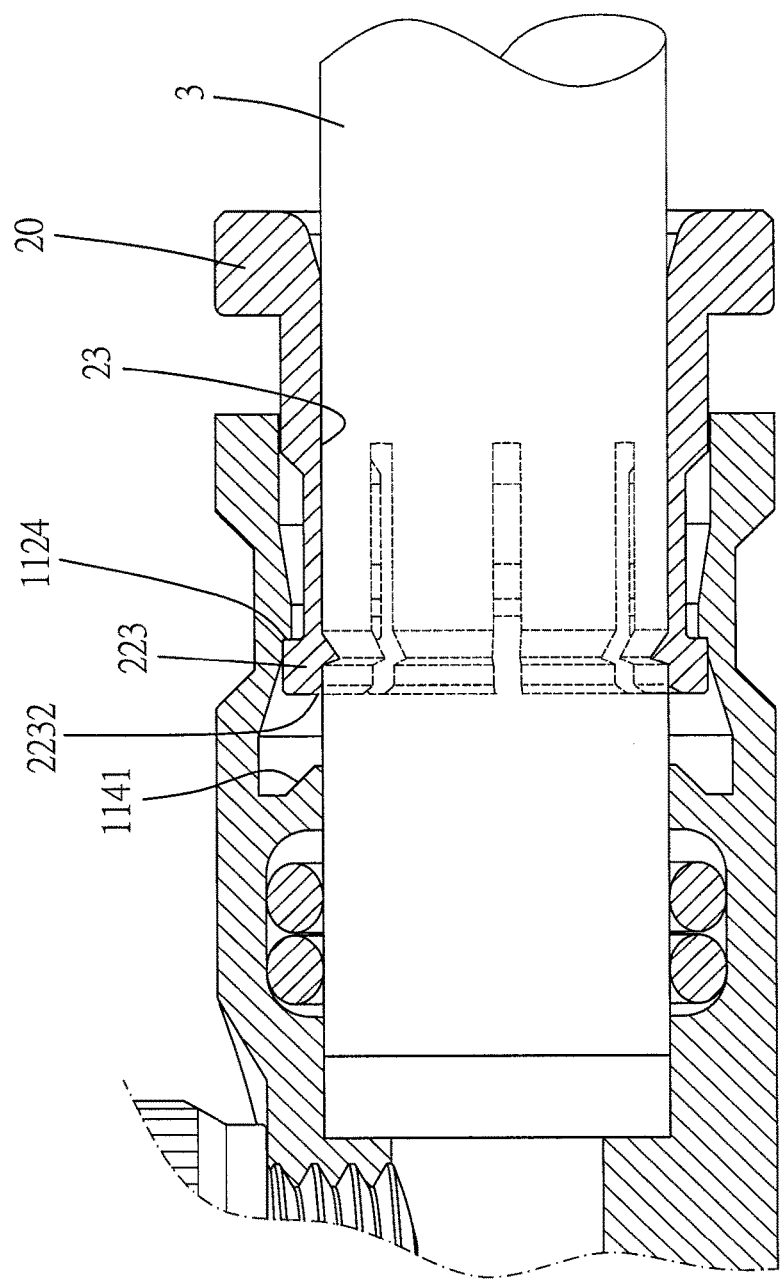
FIG. 7 is a partial profile in accordance with the first embodiment of the present invention, showing the regular state that a pipe is coupling with the pipe joint.

Please refer to FIG. 7. After the installation is accomplished, the user can release the clamping tool and the pipe can start importing high pressure liquid. The positioning socket 20 may be pushed outward by the liquid pressure and make the abutting surface 2232 of the engaging segment 223 disengage with the annular inclined surface 1141 and further make the engaging segment 223 abut against the stepped surface 1124 while the positioning socket 20 is at the outermost position of the sliding travel. At mean time, the inner diameter of the teeth 2231 as a whole is smaller than that of the pipe channel 23, and thus the pipe 3 can be griped in position by the teeth 2231 without being pushed away from the pipe joint due to the high liquid pressure.

Figure 8:
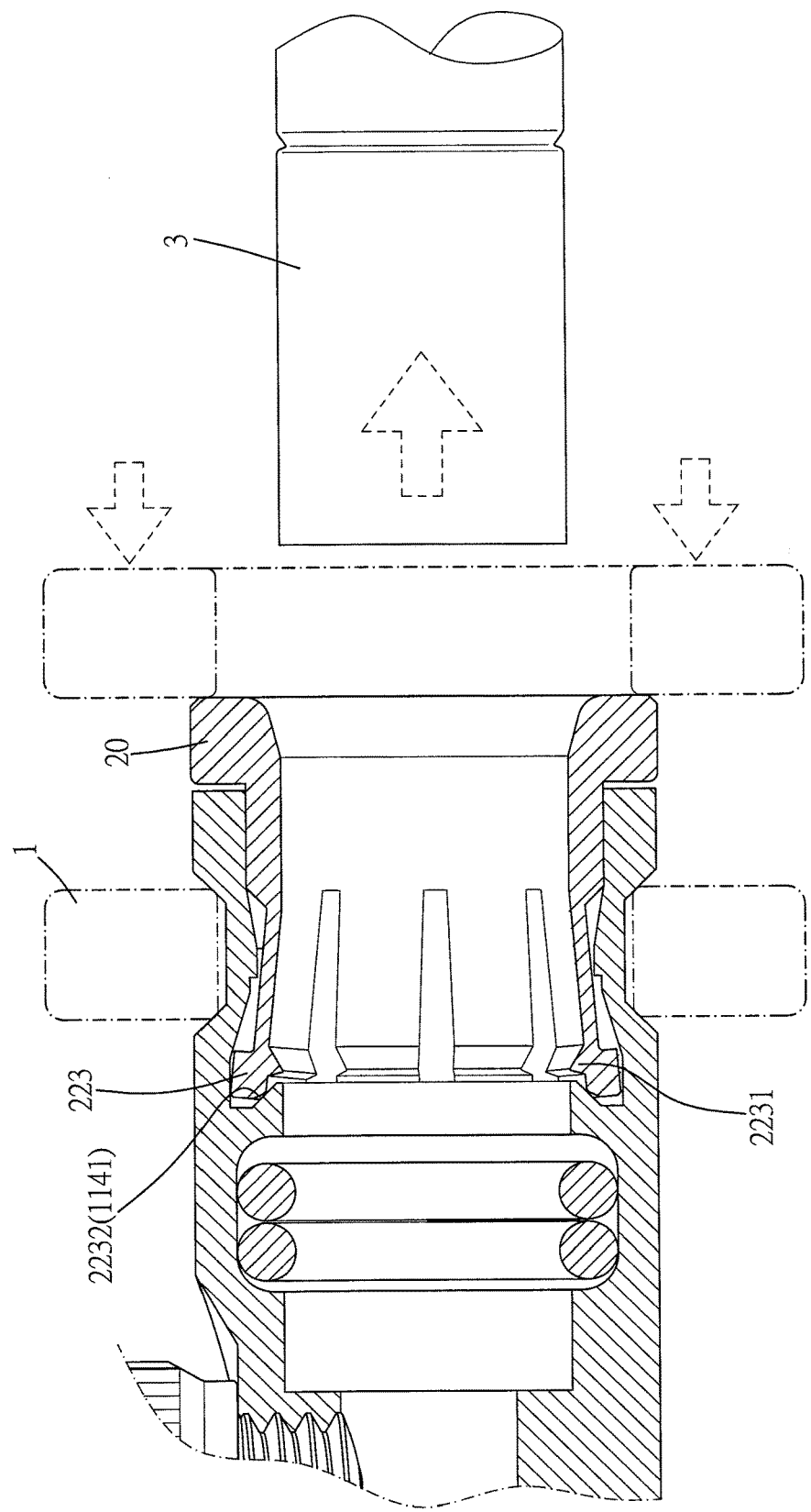
FIG. 8 is a partial profile in accordance with the first embodiment of the present invention, showing the pipe is detached from the pipe joint when the positioning socket is pressed by the clamping tool.

Please refer to FIG. 8. When it is desired to detach the pipe 3, the positioning socket 20 can once again pushed to the deepest position o the slide travel by the clamping tool 1. Thus the abutting surface 2232 of the engaging segment 223 can abut against the annular inclined surface 1141 and make the teeth 2231 released from the outer surface of the pipe 3. Thereafter, the user can detach the pipe 3 with ease.

Figure 9:
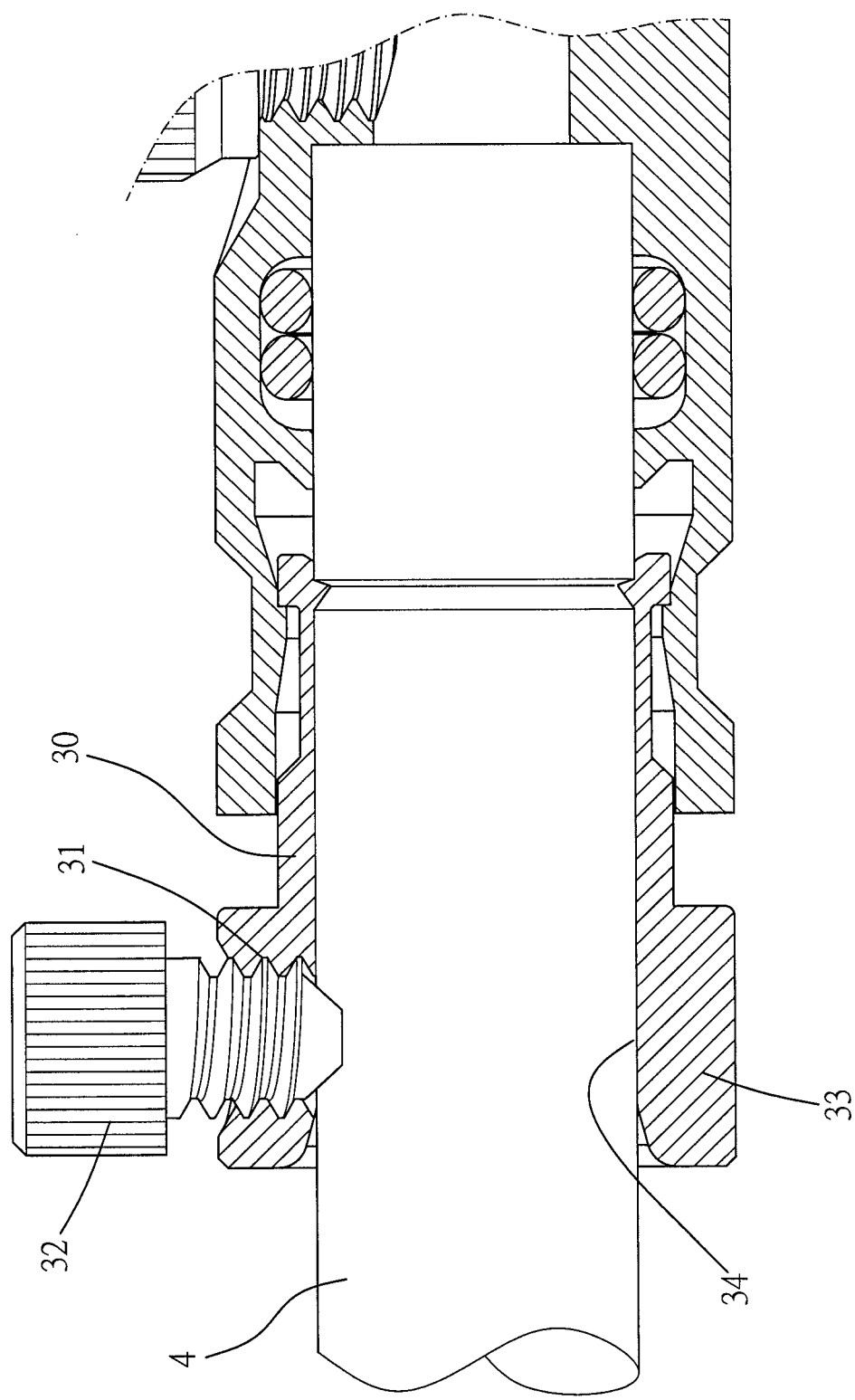
FIG. 9 is a partial profile in accordance with the first embodiment of the present invention, showing the bolt is abutting against a pipe, in which the bolt has a pointed end.

Please refer to FIG. 9. The positioning socket 30 is similar to the positioning socket 20, except that the positioning socket 30 further has a radial threaded hole 31 and a bolt 32. The radial threaded hole 31 is formed on the head 33 and is communicated with the pipe channel 34. The bolt 32 mates within the radial threaded hole 31, in which the distal end of the bolt 32 can be pointed and thus is adapted to fix the pipe 4, especially the hard pipe, in position.

Figure 10:
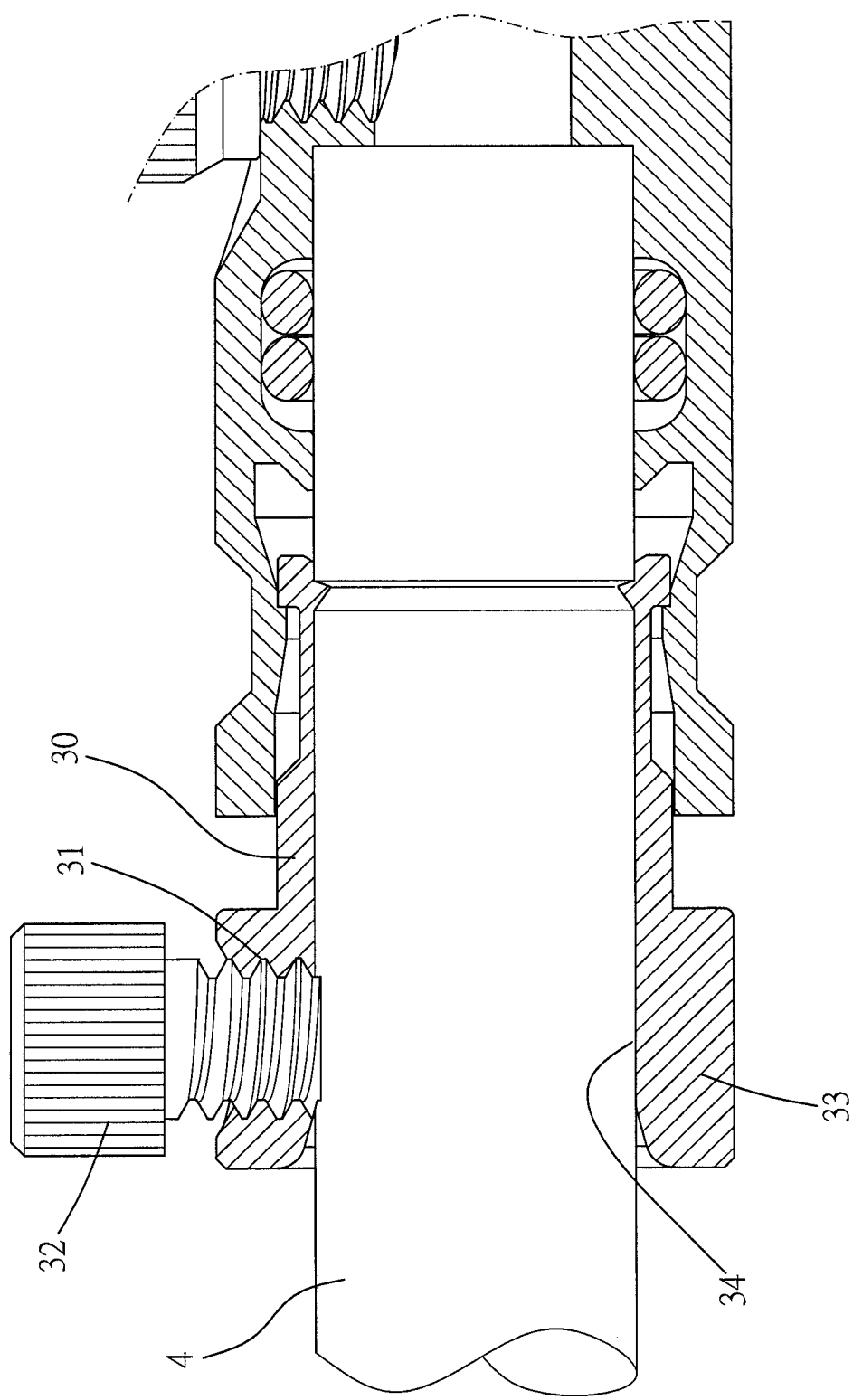
FIG. 10 is a partial profile in accordance with the second embodiment of the present invention, showing the bolt is abutting against a pipe, in which the bolt has a flat end.

Please refer to FIG. 10 for another embodiment of the present invention. The bolt 32 may alternatively has a flat distal end which functions better with soft pipes.

Figure 11:
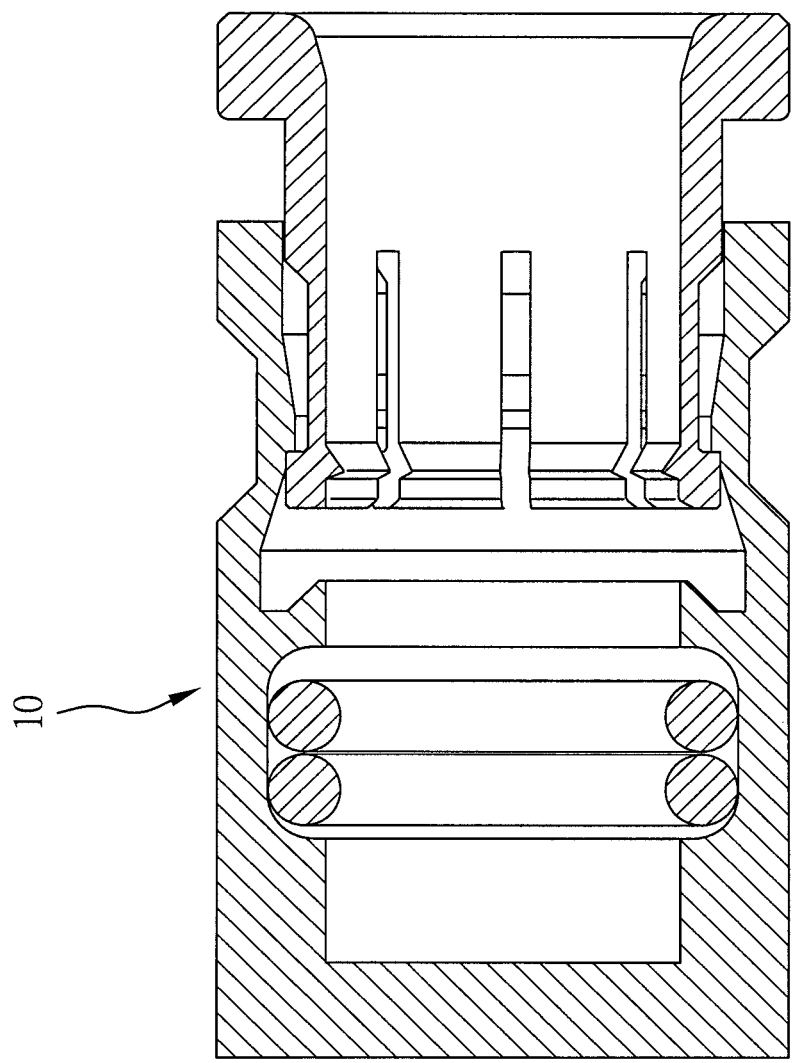
FIG. 11 is a profile in accordance with the third embodiment of the present invention.

In the aforementioned embodiments, the main body is in tubular shape and has two openings on two opposite ends. In other possible embodiments, the main body can also be in L-shape, T-shape, X-shape or other shapes that has multiple openings, not limited to two. The main body may also be formed without any nozzle connecting bores. For instance, FIG. 11 shows a main body 10 in accordance with the third embodiment of the present invention, in which the main body 10 has only one opening and no nozzle connecting bores. This type of pipe joints is suitable to be installed at tubing ends of the piping system.

The invention described above is capable of many modifications, and may vary. Any such variations are not to be regarded as departures from the spirit of the scope of the invention, and all modifications which would be obvious to someone with the technical knowledge are intended to be included within the scope of the following claims.

What is claimed is:

1. A pipe joint for coupling to at least one pipe, comprising:
   a main body, having a runner, at least one opening communicated with the runner, and a recess formed on an outer periphery of the main body, the runner having an insertion area adjacent to the opening and an inner stopping lip adjacent to the insertion area, the insertion area comprising a slide-contacting section, a tapering section and a divergent section, the tapering section being located between the slide-contacting section and the divergent section, the tapering section being more remote from the opening than the slide-contacting section, the inner stopping lip being radially extended to a center of the main body from the runner, the inner stopping lip having an annular inclined surface facing the divergent section, an accommodating zone being defined between the divergent section and the annular inclined surface, the recess being adapted for a tool to clamp; and
   at least one positioning socket, having a head, an inserting portion and a pipe channel, the inserting portion being inserted into the insertion area via the opening, the pipe channel running through the head and the inserting portion in an axial direction of the positioning socket, the inserting portion having a large diameter segment, a small diameter segment, an engaging segment and a plurality of slots, the small diameter segment being located between the large diameter and the engaging segment, the small diameter segment being more remote from the head than the large diameter segment, an outer diameter of the small diameter segment being smaller than that of the large diameter segment, the outer diameter of the large diameter segment being substantially equal to an inner diameter of the slide-contacting section, the engaging segment having a plurality of teeth extending toward a center of the positioning socket, a distal end of the engaging segment being formed with an abutting surface adapted to abut against the annular inclined surface, the slots being extended from the distal end of the engaging segment toward the small diameter segment along the axial direction in a manner that the inserting portion is radially resilient and is capable of being radially expanded or compressed;

wherein, after the inserting portion is inserted into the insertion area, the positioning socket is capable of axially slide in the main body within a sliding travel, and the engaging segment is located in the accommodating zone, the pipe channel is adapted for the pipe to insert therethrough; when the abutting surface of the engaging segment does not abut against the annular inclined surface of the inner stopping lip, an inner diameter of the teeth as a whole is smaller than an inner diameter of the pipe channel for the teeth to grip an outer surface of the pipe; when the positioning socket is located at a deepest position of the slide travel, the abutting surface of the engaging segment tightly abuts against the annular inclined surface so as to radially expand the inserting portion, and thus the inner diameter of the teeth as a whole is enlarged to be not smaller than that of the pipe channel;

wherein the positioning socket further has a radial threaded hole and a bolt, the radial threaded hole is formed on the head and communicated with the pipe channel, the bolt is adapted to engage with the radially threaded hole for abutting against the outer surface of the pipe.

2. The pipe joint of claim 1, wherein the recess is radially aligned with the insertion area.

3. The pipe joint of claim 1, wherein the insertion area further has a stepped surface between the tapering section and the divergent section, the engaging segment engages with the stepped surface when the positioning socket is located at an outermost position of the sliding travel.

4. The pipe joint of claim 1, wherein the runner further has an O-ring groove, the inner stopping lip is located between the insertion area and the O-ring groove, the pipe joint further comprises at least one O-ring received in the O-ring groove.

5. The pipe joint of claim 1, further comprising at least one nozzle connecting bore communicated with the runner for a nozzle to couple therewith.

* * * * *